OSCILLATOR AMPLITUDE CONTROL

Filed Sept. 17, 1954 2 Sheets-Sheet 1

INVENTORS E. K. VAN TASSEL
R. E. YAEGER
BY
ATTORNEY

INVENTORS E. K. VAN TASSEL
R. E. YAEGER
BY R. B. Ardis
ATTORNEY

United States Patent Office 2,992,399
Patented July 11, 1961

2,992,399
OSCILLATOR AMPLITUDE CONTROL

Earl K. Van Tassel, Westfield, and Robert E. Yaeger, Bedminster, N.J., assignors to Bell Telephone Laboratories, Incorporated, New York, N.Y., a corporation of New York Filed Sept. 17, 1954, Ser. No. 456,661
17 Claims. (Cl. 331—109)

This invention relates primarily to amplitude limiting circuits and more particularly, although in its broader aspects not exclusively, to circuit arrangements for limiting the amplitude of the output waves produced by a transistor oscillator.

A principal object of the invention is to limit both the positive and the negative excursions of an A.-C. signal wave in as simple a manner as possible.

A related object is to improve symmetry in limiting both the positive and the negative excursions of an A.-C. signal wave.

Another and more particular object is to maintain the amplitude of the oscillations produced by a transistor oscillator accurately at a predetermined level.

Still another object is to prevent the oscillation level of a transistor oscillator from drifting.

In a transistorized carrier telephone transmission system such as that disclosed in copending application Serial No. 455,099, filed September 10, 1954 (United States Patent 2,932,694, issued April 12, 1960), by V. J. Hawks, E. K. Van Tassel, and D. C. Weller, it is particularly important that the level of the oscillations produced by each carrier-frequency oscillator remain constant at all times. Margins against such phenemona as singing, crosstalk, and echoes are small in such a system in order to permit the overall loss of the system to be reduced to the lowest possible value. Unwanted changes in carrier level can, therefore, cause serious difficulty.

In the past, the amplitude level of the waves produced by a carrier-frequency oscillator has usually been maintained substantially constant either by regulating those factors, such as D.-C. bias and supply voltages, which tend to drift and thereby alter the amplitude level of the output oscillations or by providing limiting circuits which prevent the positive and negative excursions of the output wave from exceeding predetermined values. Regulating circuits for D.-C. power sources and other elements which tend to produce variations in level are, however, often relatively complex, while the limiting circuits found in the prior art tend themselves to be subject to certain inaccuracies.

The most common circuit known in the prior art for limiting both positive and negative excursions of an A.-C. signal wave takes the form of a pair of oppositely poled biased rectifying elements connected in parallel across a line carrying the signal which is to be limited. Each rectifying element is provided with a D.-C. reverse bias of a magnitude equal to the level at which the limiting is desired to take place. Then, as the signal amplitude of either polarity exceeds the magnitude of the D.-C. bias, the appropriate rectifying element provides a low impedance path across the line, limiting the signal amplitude to the magnitude of the bias. Such a circuit is, however, strictly dependent upon the magnitude of the respective D.-C. bias voltages for its accuracy. If the D.-C. bias voltages are subject to drift, so also is the final amplitude of the A.-C. signal wave for which the limiting is intended.

The present invention permits an A.-C. signal wave to be limited symmetrically on both positive and negative excursions without reliance on the accuracy of D.-C. bias and supply voltages. The possibility of drift in level due to bias voltage changes in the limiter is completely eliminated, and the amplitude of the A.-C. signal being limited is maintained at a constant level at all times. In a carrier telephone system utilizing carrier oscillators embodying the invention, the possibility of singing, crosstalk, or echoes caused by unwanted carrier level variations is avoided.

In accordance with a principal aspect of the present invention, the source of an A.-C. signal wave to be limited is provided with a p-n junction diode, having an avalanche breakdown region in its reverse conduction characteristic, connected in series with a capacitor across its output terminals. The capacitor has a discharge time at least several times greater than the minimum period of the signal wave and, under steady state conditions, causes symmetrical limiting of both positive and negative excursions of the signal wave. Excursions of one polarity are limited by the forward conducting characteristic of the diode, while excursions of the other polarity are limited by the avalanche breakdown region of the diode reverse conducting characteristic.

Embodiments of the present invention are advantageous over the prior art in a number of respects. Not only are they completely independent of the magnitudes of drift-prone D.-C. sources for determining the amplitude of the limited signal wave, but they tend to be far simpler than the devices used in the past to perform the same function. Only two circuit elements are required, eliminating any possible need for matching two separate rectifiers to close tolerances. Furthermore, there is no need for providing either separate biasing batteries for the limiting circuit or connections to another available course of D.-C. power.

A principal embodiment of the invention takes the form of a transistor oscillator suitable for use as a carrier oscillator in a transistorized carrier telephone transmission system of the type disclosed in the above-identified copending application of V. J. Hawks, E. K. Van Tassel, and D. C. Weller. A piezoelectric crystal is coupled between the transistor input and output terminals to determine the frequency of operation, a parallel-resonant circuit tuned to the desired carrier frequency is connected across the oscillator output terminals to maintain the crystal in its proper mode of operation and to filter out any generated harmonics, and an avalanche breakdown diode is connected in series with a capacitor across the parallel-resonant circuit to provide symmetrical limiting on both positive and negative excursions of the oscillator output wave.

From another aspect, the invention takes the form of a feedback oscillator in which the combination of a capacitor and an avalanche breakdown diode is utilized instead of the saturation characteristics of the amplifying element to adjust the loop gain to unity. Broadly, a feedback oscillator includes gain-producing means, frequency-selective means to determine the frequency of oscillation, and limiting means to adjust the gain around the feedback loop to unity. In the past, most feedback oscillators have relied upon saturation of the gain-producing device, e.g., vacuum tube or transistor, for the limiting which adjusts the loop gain to unity and fixes the amplitude of oscillation. Transistor and vacuum tube saturation characteristics tend, however, to vary with applied battery voltages; and, as a result, the amplitude of the generated oscillations tend to vary accordingly.

In accordance with the present invention, a feedback oscillator is provided in its feedback loop with the series combination of a capacitor and an avalanche breakdown diode. As discussed previously, the capacitor has a discharge time at least several times greater than the period of the generated oscillations. The gain-producing device of the oscillator is provided with gain in excess of that needed merely to reach the level fixed by the limiter in order to insure limiting action regardless of anticipated variations in D.-C. bias and supply voltages, and the capacitor and the avalanche breakdown diode cooperate to adjust the loop gain of the oscillator to unity. The level of the output oscillations is thereby maintained constant at all times and is independent of variations in the saturation characteristics of the gain-producing vacuum tube or transistor caused by D.-C. voltage variations.

A more complete understanding of the invention may be obtained from a study of the following detailed description of several specific embodiments. In the drawings.

Figure 1:
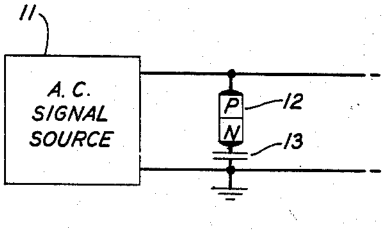
FIG. 1 is a generalized representation of an embodiment of the present invention.

The generalized embodiment of the invention illustrated in FIG. 1 includes an A.-C. signal source 11 having a limiting circuit connected across its output terminals. In accordance with the invention, the limiting circuit includes an avalanche breakown diode 12 connected in series with a capacitor 13.

Diode 12 is a p-n junction diode having, in addition to the usual low resistance in the forward direction, a reverse conduction characteristic which includes both a region of high resistance for applied voltages below a critical value and a well-defined region of substantially constant voltage for applied voltages in excess of the critical value. By way of example, diodes of this type are described in the article by G. L. Pearson and B. Sawyer, "Silicon P-N Junction Alloy Diodes," appearing at page 1348 of the November 1952 issue of the Proceedings of the I.R.E. The discharge time of capacitor 13 is at least several times greater than the minimum period of the signal wave produced by A.-C. source 11.

Figure 2:
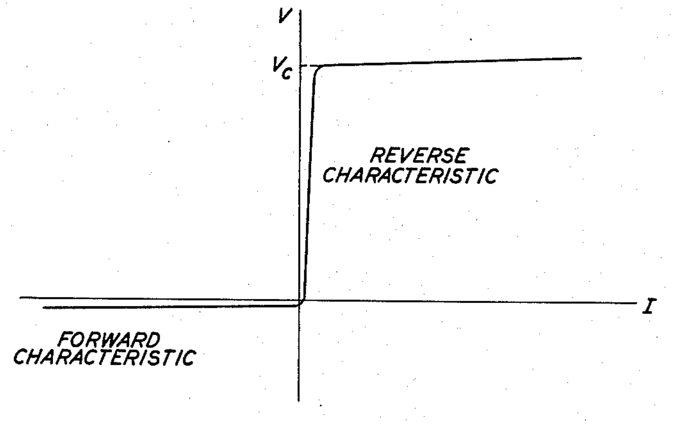
FIG. 2 illustrates the current-voltage characteristic of a typical diode having an avalanche breakdown region in its reverse conduction characteristic.

FIG. 2 illustrates the current-voltage characteristics of p-n junction diode 12 in the embodiment of the invention illustrated in FIG. 1. As illustrated, the conducting characteristic of diode 12 resembles those of many rectifying devices in its forward conducting region and in its reverse conducting region for voltages below the critical or avalanche breakdown value $V_c$. Diode 12 has a very low resistance (of an order of magnitude measured in ohms) in the forward direction and a very high resistance (of an order of magnitude measured in megohms) in the reverse direction for applied voltages $V_c$. For applied voltages in excess of $V_c$, however, diode 12 is a substantially constant voltage device with a very low resistance (of an order of magnitude measured once more in ohms).

In embodiments of the present invention, the avalanche breakdown voltage of diode 12 is selected to be substantially equal to twice the value at which the peak amplitude of the output wave of oscillator 11 is to be limited. The level at which the peak amplitude of the output wave of oscillator 11 is to be limited is, in turn, selected so as to be well below the amplitude of that wave without limiting in order to provide a margin sufficient to prevent such factors as drift of the oscillator D.-C. voltage sources from affecting the final amplitude of the output wave.

In the steady-state operation of the embodiment of the invention illustrated in FIG. 1, negative excursions of the signal wave are limited by the avalanche breakdown region of the reverse characteristic of diode 12, while positive excursions are limited by the forward conducting characteristic. Before steady-state conditions are reached, however, a transient exists for at least several cycles of the signal wave. Initially, positive half-cycles of the signal wave are completely clipped by the forward conducting characteristic of diode 12, while positive half-cycles are limited only after they reach the value $V_c$.

With each succeeding cycle of the signal wave, however, the charge on condenser 13 builds up. Since its discharge time has been made at least several times longer than the minimum period of the signal wave, condenser 13 cannot discharge completely in a single cycle. As the charge on condenser 13 begins to build up, diode 12 begins to permit a larger and larger portion of the positive excursions of the signal wave to pass without limiting them and correspondingly smaller and smaller portions of the negative excursions. Finally, when equilibrium is reached, the voltage on condenser 13 is just equal to half of the diode avalanche breakdown voltage $V_c$. The level of the positive signal excursions, as limited by the forward characteristic of diode 12, is then equal to the level of the negative excursions limited by the avalanche breakdown region of the reverse characteristic. The voltage applied across condenser 13 during any charging interval is then equal only to one half of the diode avalanche breakdown voltage $V_c$, and the charge on condenser 13 thereafter remains substantially constant. Limiting is symmetrical on both positive and negative excursions of the signal wave and is not dependent upon the magnitudes of any applied D.-C. bias voltages.

Figure 3:
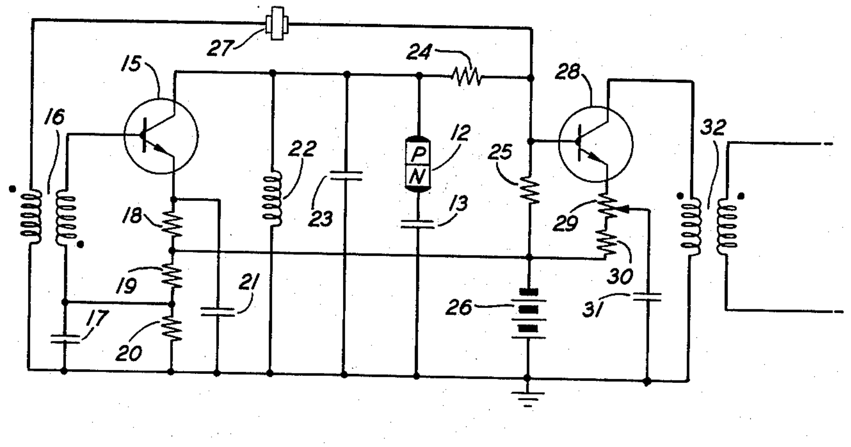
FIG. 3 shows one carrier-frequency transistor oscillator embodying the invention.

A specific embodiment of the invention particularly suitable for use in the carrier telephone system disclosed in the above-identified copending application by V. J. Hawks, E. K. Van Tassel, and D. C. Weller is the transistor carrier oscillator shown in FIG. 3. In FIG. 3, the source of the A.-C. signals to be limited is a carrier-frequency oscillator using a transistor 15 as the gain-producing element. The base electrode of transistor 15 is connected through the secondary winding of a phase-inverting transformer 16 to one side of a bypass condenser 17, the other side of which is grounded. The emitter electrode of transistor 15 is connected to ground through three series resistors 18, 19, and 20. A bypass condenser 21 is connected between the emitter electrode of transistor 15 and ground, while the junction between resistors 19 and 20 is connected to the ungrounded side of bypass condenser 17.

An inductance coil 22 and a capacitor 23 are connected in parallel between the collector electrode of transistor 15 and ground and are tuned to the frequency at which the circuit is intended to oscillate. The collector electrode of transistor 15 is, in addition, returned to ground through the series combination of a first resistor 24, a second resistor 25, and a negative D.-C. supply source 26. From a point between resistors 24 and 25, a piezoelectric frequency-determining crystal 27 is returned to one side of the primary winding of transformer 16, the other side of which is grounded. The junction between resistor 25 and D.-C. supply source 26 is connected directly to the common point between resistors 18 and 19 in the emitter-to-ground path of transistor 15. In accordance with the present invention, avalanche breakdown diode 12 and capacitor 13 are also connected in series between the collector electrode of transistor 15 and ground.

The elements which have thus far been set forth constitute a transistor carrier-frequency oscillator provided with symmetrical limiting in accordance with the present invention in order to adjust the gain of the feedback loop to unity. The transistor circuit is of the so-called common-emitter configuration, and transformer 16 is poled to feed back signals from the collector electrode of transistor 15 in phase to the base electrode. In this manner, the circuit is caused to sustain oscillations at a frequency determined substantially by piezoelectric crystal 27. The diode 12 and capacitor 13 featured by the present invention operate in the manner described in connection with FIG. 1 and provide symmetrical limiting of both positive and negative excursions of the resulting signal under steady-state conditions and adjust the loop gain of the circuit to unity. The tuned circuit made up of inductance 22 and capacitor 23 helps insure that crystal 27 oscillates in its intended mode by providing a large reduction in gain at all frequencies other than those near the fundamental crystal frequency and thereby making it unlikely that there will be sufficient gain for oscillation in other modes. In addition, the tuned circuit tends to eliminate harmonics which would otherwise result through the limiting action of diode 12 and capacitor 13. The resulting signal wave appearing between resistor 24 and ground is substantially a pure sine wave having a peak amplitude equal to half the avalanche breakdown voltage of diode 12 or an R.M.S. amplitude of $$\frac{1}{2\sqrt{2}}$$

times the breakdown voltage.

To increase the level of the amplitude-limited oscillations appearing between resistor 24 and ground in the embodiment of the invention shown in FIG. 3, a second transistor 28 is provided. Transistor 28 is also connected in the so-called common-emitter configuration and has its base electrode connected directly to the junction between resistors 24 and 25. The emitter electrode of transistor 28 is returned to negative potential source 26 through the resistance arm of a potentiometer 29 and a series resistor 30. A bypass capacitor 31 is returned to ground from the variable tap on potentiometer 29. A signal output path is formed by a transformer 32 which has its primary winding connected between the collector electrode of transistor 28 and ground.

Potentiometer 29 is present, in the embodiment of the invention illustrated in FIG. 3, in order to provide a fine adjustment of the output level of the generated oscillations. The oscillation amplitude appearing between the base electrode of transistor 28 and ground is dependent largely upon the avalanche breakdown voltage of diode 12. To compensate for slight departures of this breakdown voltage in different diodes from the exact value desired, adjustment of the final output signal amplitude may be made by means of potentiometer 29. Since the portion of the resistance arm of potentiometer 29 between the variable tap and the emitter electrode of transistor 28 is unbypassed at the oscillation frequency, it provides gain-reducing negative feedback. Potentiometer 29 thus provides an extremely accurate control of the gain of the output stage of amplification.

Figure 4:
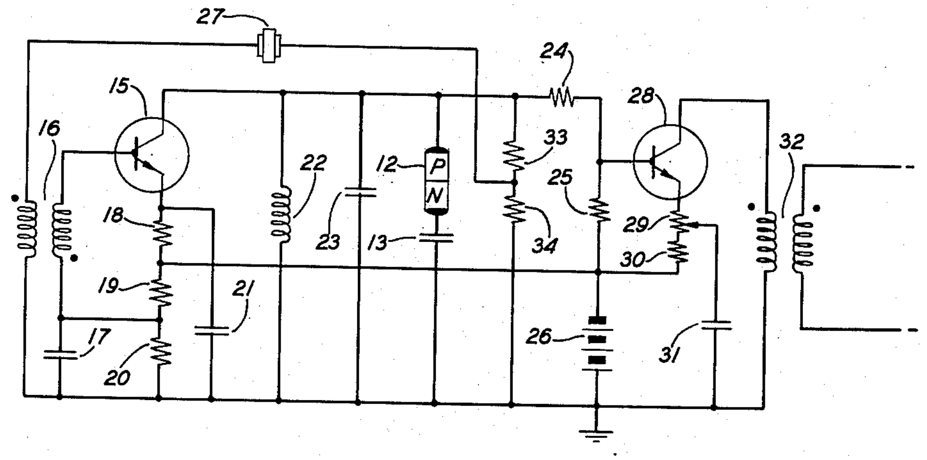
FIG. 4 illustrates another carrier-frequency transistor oscillator embodying the invention.

FIG. 4 illustrates an embodiment of the invention which is a variation of the transistor carrier-frequency oscillator illustrated in FIG. 3. In FIG. 4, instead of being connected directly to the base electrode of transistor 28, crystal 27 is connected to the junction point between a pair of resistors 33 and 34 which are connected in series between the collector electrode of transistor 15 and ground.

In order to adjust the current flowing through crystal 27, it is desirable to have a separate control from that determined by the D.-C. bias requirements of transistor 28. In FIG. 3, the crystal tap provided between resistors 24 and 25 determines the D.-C. bias voltage applied to the base of transistor 28. In FIG. 4, on the other hand, resistors 33 and 34 provide a crystal tap independent of the biasing circuit for transistor 28.

It is to be understood that the arrangements which have been described are illustrative of the application of the principles of the invention. Numerous other arrangements may be devised by those skilled in the art without departing from the spirit and scope of the invention.

What is claimed is:

1. In combination, a feedback oscillator, means connected in the feedback loop thereof to adjust the oscillator loop gain to unity which comprises a p-n junction diode having an avalanche breakdown region in its reverse conduction characteristic connected in series with a capacitor across the feedback path of said oscillator, the avalanche breakdown voltage of said diode being less than the peak-to-peak voltage of the output signals produced by said oscillator in the absence of said diode and capacitor and the discharge time of said capacitor being at least several times greater than the minimum period of the output signals produced by said oscillator, and output means connected across the series combination of said diode and said capacitor.

2. In combination, an amplifying device having a pair of input terminals and a pair of output terminals, and a frequency-selective regenerative feedback path coupling said output terminals back to said input terminals, whereby said amplifying device generates sustained oscillations at the frequency determined by said feedback path and supplies them to said output terminals, means to adjust the loop gain around said feedback path and through said amplifying device to unity which comprises a p-n junction semiconductor diode having an avalanche breakdown region in its reverse conduction characteristic connected in series with a capacitor across said feedback path, the avalanche breakdown voltage of said diode being less than the peak-to-peak voltage that would be attained by said oscillations in the absence of said diode and capacitor and the discharge time of said capacitor being at least several times greater than the minimum period of said oscillations, and output means connected across the series combination of said diode and said capacitor.

3. In combination, a transistor having an emitter electrode, a collector electrode, a base electrode, and a gain sufficient to generate oscillations of at least a predetermined peak-to-peak voltage, two of said electrodes comprising a pair of input terminals and another two of said electrodes comprising a pair of output terminals, a regenerative feedback path including a frequency-determining impedance coupling said output terminals back to said input terminals, and means to supply direct operating potentials to said electrodes, whereby said transistor generates sustained oscillations at the frequency fixed by said frequency-determining impedance and supplies them to said output terminals, means to adjust the loop gain around said feedback path and through said transistor to unity which comprises a p-n junction semiconductor diode having a substantially constant voltage region in its reverse conduction characteristic for applied voltages in excess of a critical value connected in series with a capacitor across said feedback path, said critical value being less than said predetermined peak-to-peak voltage and the discharge time of said capacitor being at least several times greater than the minimum period of said oscillations, and output means connected across the series combination of said diode and said capacitor.

4. In combination, a transistor having an emitter electrode, a collector electrode, a base electrode, and a gain sufficient to generate oscillations of at least a predetermined peak-to-peak voltage, two of said electrodes comprising a pair of input terminals and another two of said electrodes comprising a pair of output terminals, a regenerative feedback path including a frequency-determining piezoelectric crystal coupling said output terminals back to said input terminals, and means to supply direct operating voltages to said electrodes, whereby said transistor generates sustained oscillations at the frequency determined by said crystal and supplies them to said output terminals, an inductance and a first capacitor connected in parallel across said output terminals and tuned to the oscillation frequency, whereby harmonic components of the output wave produced by said transistor are substantially eliminated and oscillation in the desired mode of said crystal is assured, means to adjust the loop gain around said feedback path and through said transistor to unity which comprises a second capacitor and a p-n junction semiconductor diode connected in series across said feedback path, and output means connected across the series combination of said second capacitor and said diode, said diode having a low impedance forward conduction characteristic, a high impedance reverse conduction characteristic for applied voltages below a critical value, and a low impedance reverse conduction characteristic for applied voltages in excess of said critical value, said critical value being less than said predetermined peak-to-peak voltage, and the discharge time of said second capacitor being at least several times greater than the period of said oscillations.

5. In combination, a transistor having an emitter electrode, a collector electrode, a base electrode, and a gain sufficient to generate oscillations of at least a predetermined peak-to-peak voltage, an input circuit interconnectiny said base and emitter electrodes, an output circuit interconnecting said collector and emitter electrodes, a phase-inverting transformer having a primary winding and a secondary winding, said secondary winding being connected in said input circuit between said base and emitter electrodes, a piezoelectric crystal connected between said collector electrode and the primary winding of said transformer, and means to supply direct operating potentials to said transistor electrodes, whereby said transistor generates sustained oscillations substantially at a frequency determined by said crystal and supplies them to said output circuit, an inductance and a first capacitor connected in parallel across said output circuit and tuned to the oscillation frequency, whereby harmonic components of the output wave produced by said transistor are substantially eliminated and oscillation in the desired mode of said crystal is assured, means to adjust the gain of the regenerative feedback loop formed by said transistor, said transformer, said crystal, and said tuned circuit to unity which comprises a second capacitor and a p-n junction semiconductor diode connected in series across said output circuit, and output means connected across the series combination of said second capacitor and said diode, said diode having an avalanche breakdown region in its reverse conduction characteristic, the avalanche breakdown voltage of said diode being less than said predetermined peak-to-peak voltage, and the discharge time of said capacitor being at least several times greater than the period of said oscillations.

6. In combination, an oscillator having a pair of output terminals, means to limit both positive and negative excursions of the output signals produced by said oscillator symmetrically to a predetermined value under steady-state conditions which comprises a capacitor and a p-n junction semiconductor diode connected in series between said output terminals, said diode having a low impedance forward conduction characteristic, a high impedance reverse conduction characteristic for applied voltages below a critical value, and a low impedance reverse conduction characteristic for applied voltages in excess of said critical value, said critical voltage value being substantially equal to twice said predetermined value but less than the maximum peak-to-peak voltage of the output signals produced by said oscillator in the absence of said diode and capacitor, and the discharge time of said capacitor being at least several times greater than the minimum period of the output signals produced by said oscillator, a negative feedback amplifier connected across the series combination of said capacitor and said diode to amplify the output signals produced by said oscillator, and means to adjust the amount of feedback applied to said negative feedback amplifier, whereby the output signals appearing at the output end of said amplifier may be adjusted in amplitude to compensate for any variation of said critical voltage value of said diode from the intended level.

7. In combination, a source of A.-C. signals having a predetermined maximum peak-to-peak voltage, means to limit both positive and negative excursions of said signals symmetrically under steady-state conditions which comprises a p-n junction semiconductor diode having a substantially constant voltage region in its reverse conduction characteristic for applied voltages in excess of a critical value connected in series with a capacitor across said source, said critical value being less than said maximum peak-to-peak voltage, and the discharge time of said capacitor being at least several times greater than the minimum period of said signals, and output means connected across the series combination of said diode and said capacitor.

8. In combination, a source of A.-C. signals having a predetermined maximum peak-to-peak voltage, means to limit both positive and negative excursions of said signals symmetrically under steady-state conditions which comprises a capacitor and a p-n junction semiconductor diode connected in series across said source, and output means connected across the series combination of said capacitor and said diode, said diode having a low impedance forward conduction characteristic, a high impedance reverse conduction characteristic for applied voltages below a critical value, and a low impedance reverse conduction characteristic for applied voltages in excess of said critical value, said critical value being less than said maximum peak-to-peak voltage, and the discharge time of said capacitor being at least several times greater than the minimum period of said signals.

9. In combination, a source of A.-C. signals having a predetermined maximum peak-to-peak voltage, means to limit both positive and negative excursions of said signals symmetrically to a predetermined value under steady-state conditions which comprises a capacitor and a p-n junction semiconductor diode having a substantially constant voltage region in its reverse conduction characteristic for applied voltages in excess of a critical value connected in series across said source, and output means connected across the series combination of said capacitor and said diode, said critical voltage value being substantially equal to twice said predetermined value but less than said maximum peak-to-peak voltage, and the discharge time of said capacitor being at least several times greater than the minimum period of said signals.

10. In combination, a source of A.-C. signals having a predetermined maximum peak-to-peak voltage, said source having a pair of output terminals, means to limit both positive and negative excursions of said signals symmetrically to a predetermined value under steady-state conditions which comprises a capacitor and a p-n junction semiconductor diode having an avalanche breakdown region in its reverse conduction characteristic connected in series between said output terminals, and output means connected across the series combination of said capacitor and said diode, the avalanche breakdown voltage of said diode being substantially equal to twice said predetermined value but less than said maximum peak-to-peak voltage, and the discharge time of said capacitor being at least several times greater than the minimum period of said signals.

11. An electrical circuit comprising a rectifier having a voltage-current characteristic curve comprising two similarly inclined low resistance branches interconnected by a high-resistance branch, means for impressing an alternating signal voltage across said rectifier to cause said rectifier to operate in said two low resistance branches of said curve, and means connected in the path of current through said rectifier for maintaining the average value of direct current through said rectifier substantially equal to zero.

12. An electrical circuit comprising an impedance element, said impedance element providing for conductance in a forward direction and a lesser degree of conductance in a reverse direction, said impedance element having a sharply defined low impedance breakdown region in said reverse direction, means for impressing an alternating voltage across said impedance element having a magnitude to cause said impedance element to operate in said low impedance breakdown region, and means for causing conducted current in said forward direction to be equal to conducted current in said reverse direction.

13. An electrical circuit comprising a rectifying element, said rectifying element comprising a body of semiconductive material having therein a zone of one conductivity type contiguous with a zone of the opposite conductivity type forming a semiconductor junction therebetween, said rectifying element exhibiting substantial conductivity in a forward direction and a region of substantial conductivity in a reverse direction, said conductivity in said reverse direction occurring only with the application of voltages having magnitudes equal to and greater than a critical voltage, means for applying an alternating voltage having a magnitude greater than said critical voltage to said rectifying element, and means for maintaining current conducted through said rectifying element in said forward direction equal to current conducted through said rectifying element in said reverse direction.

14. An electrical network having a first, a second, and a third terminal and comprising means for blocking the conduction of direct current between said first and second terminals, a semiconductor junction diode connected between said second terminal and said third terminal, said diode having a Zener breakdown characteristic at inverse voltages having a magnitude greater than a critical magnitude, means for applying an alternating voltage having a magnitude greater than said critical magnitude between said first terminal and said third terminal, and means for obtaining an output voltage between any two of said terminals.

15. An electrical circuit comprising a semiconductor junction diode having a current-voltage characteristic providing for a substantial current flow for voltages applied across said diode in a forward direction, substantially lower current flow in a reverse direction for voltages applied across said diode in a reverse direction and substantial current flow in said reverse direction at a predetermined magnitude of said applied reverse voltage, direct-current blocking means comprising a capacitor connected in series with said diode, and means for applying an alternating voltage across said direct-current blocking means and said diode.

16. In combination with a semiconductor diode having a predetermined Zener breakdown voltage, a capacitor connected in a series circuit with said diode, a source of alternating voltage having a magnitude greater than the magnitude of the Zener voltage, means connecting said source of alternating voltage across said diode, a loading circuit, and means for connecting said loading circuit across said capacitor.

17. In combination with a semiconductor diode having a predetermined Zener breakdown voltage, a capacitor connected in a series circuit with said diode, a source of alternating voltage having a magnitude greater than the magnitude of the Zener voltage, means connecting said source of alternating voltage across said diode, a loading circuit, and means for connecting said loading circuit across said diode.

References Cited in the file of this patent

UNITED STATES PATENTS

| | | |
|---|---|---|
| 2,230,091 | Scherer et al. | Jan. 28, 1941 |
| 2,275,452 | Meacham | Mar. 10, 1942 |
| 2,303,862 | Peterson | Dec. 1, 1942 |
| 2,375,575 | Morland | May 18, 1945 |
| 2,485,731 | Gruen | Oct. 25, 1949 |
| 2,594,336 | Mohr | Apr. 29, 1952 |
| 2,652,460 | Wallace | Sept. 15, 1953 |
| 2,655,608 | Valdes | Oct. 13, 1953 |
| 2,692,343 | Spiro | Oct. 19, 1954 |
| 2,693,572 | Chase | Nov. 2, 1954 |
| 2,703,368 | Wrathall | Mar. 1, 1955 |
| 2,713,162 | Gehman | July 12, 1955 |
| 2,714,702 | Shockley | Aug. 2, 1955 |
| 2,760,087 | Felker | Aug. 21, 1956 |
| 2,789,254 | Bodle et al. | Apr. 16, 1957 |